Dec. 10, 1935.                    W. J. DE WITT                    2,023,918
                                    FISH LURE
                                Filed April 5, 1935

Inventor
William J. DeWitt
by Roberts, Cushman & Woodberry
attys.

Patented Dec. 10, 1935

2,023,918

UNITED STATES PATENT OFFICE 2,023,918

FISH LURE

William J. De Witt, Auburn, N. Y., assignor to Shoe Form Co., Inc., Auburn, N. Y., a corporation of New York Application April 5, 1935, Serial No. 14,745

4 Claims. (Cl. 43—46)

This invention relates to an improvement in fish lures including hooks to which the bait is secured in any desired position.

The primary object of this invention is to provide a fish lure comprising a shell to which hooks are adjustably secured and in which are openings for the purpose of agitating the water upon relative movement of the lure and water.

A further object of this invention is to provide in a lure of the above described type means for passing the strain of a caught fish directly to the lead line thus relieving the shell thereof.

These and other objects will appear from an examination of the following description and of the drawing which forms a part thereof and in which Fig. 1 is a plan view of a fish lure embodying this invention;

Figure 1:
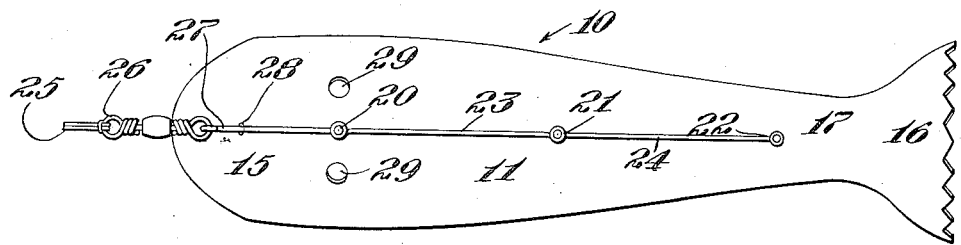
Figure 2:
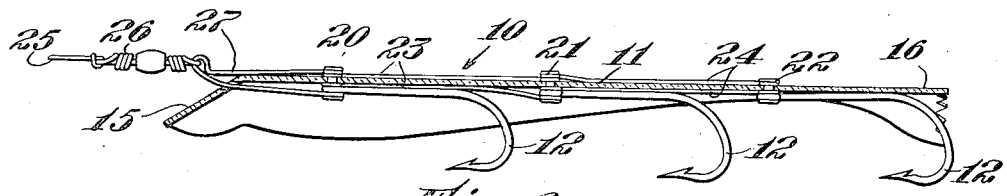
Fig. 2 is a longitudinal section thereof.
Figure 3:
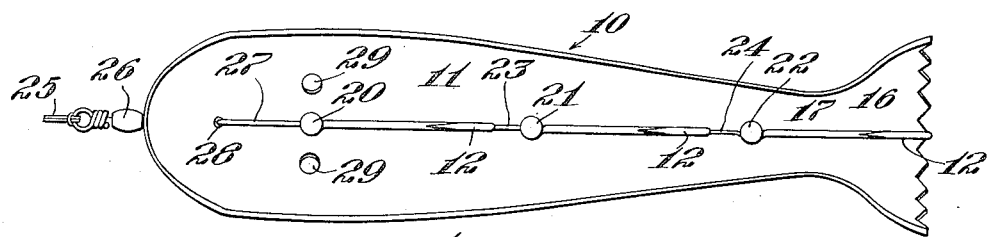
Fig. 3 is a bottom plan view of the lure.

The lure 10 shown in the drawing comprises a shell 11 to the underside of which a plurality of hooks 12 are pivotally attached. The shell 11 may be of wood, celluloid or other suitable material lighter than water. The surface of the shell is preferably curved, the convex side being uppermost. The shell terminates at one end in a downwardly bent nose 15 and at the other end in a tail 16 which flares downwardly and laterally from a narrow substantially flat portion 17.

The hooks 12 are secured at the mid-longitudinal center of the shell to rivets, buttons or studs 20, 21 and 22 which pass through the eyes at the ends of the hooks. The rivets are connected by duplicate bars 23 and 24, extending along both the upper and the under sides of the shell. The lead line 25, which includes a swivel member 26, is connected by a U-shaped bar 27 to the first rivet. One leg of the bar 27 passes through a hole 28 in the nose 15 and extends along the under side of the shell 11 while the other leg extends along the upper side. Formed in the shell are a pair of openings 29 here shown located at either side of the rivet 20. The water passing through these openings forms bubbles or is otherwise disturbed particularly when the lure is on or near the surface thus setting up vibrations which render the lure more attractive to the fish.

From the above description it will appear that the strain of a caught fish on any of the hooks is transmitted directly to the swivel member 26 of the lead line 25 through one or more of the bars 27, 23 and 24. The bar 27 connects the swivel member to the leading hook directly, to the second hook through the bar 23 and to the third hook through the bars 23 and 24. The bars 27, 23 and 24 reinforce the center of the shell and since they are located on both sides of the shell they serve to resist any tendency of the shell to bend transversely.

Figure 4:
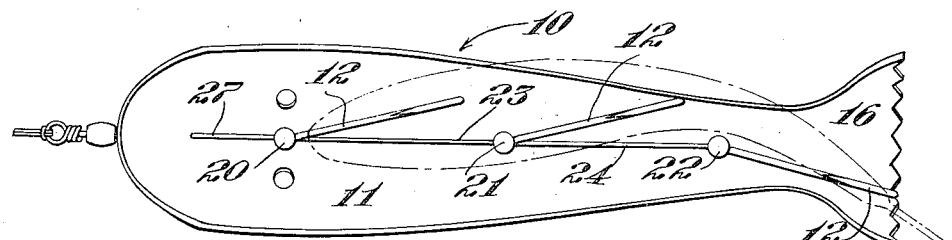
Fig. 4 is a view similar to Fig. 3 illustrating positions which might be assumed by the hooks to hold a minnow in a desired position.
Figure 5:
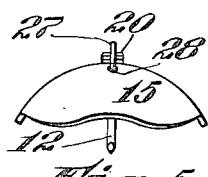
Fig. 5 is a front view of the lure, a portion of the lead swivel member being omitted.

As suggested in Fig. 4 the hooks 12 are pivotally secured upon the rivets so that they can be swung to hold the bait in any desired position. When the bait (indicated by dotted lines) is fixed off the center as shown in this figure the balance of the lure is obviously upset so that it is spun by its movement relative to the water and its attractiveness to fish is increased.

While one embodiment of this invention has been shown and described it will be understood that I am not limited thereto and that other embodiments may be made without departing from the spirit and scope of the invention as set forth in the accompanying claims.

I claim:

1. A fish lure comprising a shell, at least two hooks pivotally secured to one side of said shell along the mid-longitudinal line thereof, a bar adapted to connect the first hook to a lead line and a second bar connecting said first and second hooks whereby the strain of a caught fish is transmitted by said bars directly to said lead line.

2. A fish lure comprising a shell curved along a mid-longitudinal line, one or more hooks along said line at the concave side of the shell, rivets by which the hooks are secured to the shell, and bars adapted to connect said rivets to a lead line.

3. A fish lure comprising a shell curved along a mid-longitudinal line, one or more hooks along said line at the concave side of the shell, rivets by which the hooks are secured to the shell, and bars adapted to connect said rivets to a lead line and extending along both sides of the shell.

4. A fish lure comprising a shell curved along a mid-longitudinal line, and terminating at one end in a downwardly extending nose, three hooks along said line at the concave side of the shell, said hooks having eyes therein, rivets passed through the eyes of said hooks and pivotally securing the hooks to the shell, a bar passed through an opening in the nose of the shell to the concave side thereof and adapted to connect the first rivet to a lead line, and bars along both sides of the shell connecting the first and second rivets and the second and third rivets.

WILLIAM J. DE WITT.